US009463763B2

(12) United States Patent
Watamori et al.

(10) Patent No.: US 9,463,763 B2
(45) Date of Patent: Oct. 11, 2016

(54) OCCUPANT PROTECTION APPARATUS FOR VEHICLE

(71) Applicant: Fuji Jukogyo Kabushiki Kaisha, Tokyo (JP)

(72) Inventors: Takatomo Watamori, Tokyo (JP); Kazuhito Ozora, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/806,491

(22) Filed: Jul. 22, 2015

(65) Prior Publication Data
US 2016/0039385 A1    Feb. 11, 2016

(30) Foreign Application Priority Data

Aug. 6, 2014   (JP) ................................. 2014-160707

(51) Int. Cl.
    *B60R 21/231*    (2011.01)
(52) U.S. Cl.
    CPC .................... *B60R 21/23138* (2013.01); *B60R 2021/23107* (2013.01); *B60R 2021/23146* (2013.01); *B60R 2021/23161* (2013.01)
(58) Field of Classification Search
    CPC .......... B60R 21/23138; B60R 21/203; B60R 21/233; B60R 2021/23107; B60R 2021/23308
    USPC ...................................................... 280/730.2
    See application file for complete search history.

(56) References Cited

U.S. PATENT DOCUMENTS

| 3,791,667 | A | * | 2/1974 | Haviland | ................ | B60R 21/20 280/730.2 |
| 5,575,497 | A | * | 11/1996 | Suyama | ................ | B60R 21/231 280/730.1 |
| 8,678,429 | B2 | * | 3/2014 | Nagasawa | ............. | B60R 21/233 280/729 |
| 2005/0035577 | A1 | * | 2/2005 | Barko | ...................... | B60R 21/33 280/730.2 |
| 2009/0121462 | A1 | * | 5/2009 | Rick | ...................... | B60R 21/206 280/729 |
| 2013/0270805 | A1 | * | 10/2013 | Kruse | ................... | B60R 21/232 280/730.2 |
| 2014/0239619 | A1 | * | 8/2014 | Fukawatase | .......... | B60R 21/232 280/730.2 |
| 2015/0115581 | A1 | * | 4/2015 | Mazanek | .............. | B60R 21/232 280/730.2 |
| 2015/0166002 | A1 | * | 6/2015 | Fukawatase | .......... | B60R 21/233 280/730.1 |
| 2015/0191141 | A1 | * | 7/2015 | Wang | ................... | B60R 21/213 280/730.2 |

FOREIGN PATENT DOCUMENTS

JP    2000-247199 A    9/2000

* cited by examiner

*Primary Examiner* — Faye M Fleming
(74) *Attorney, Agent, or Firm* — McGinn IP Law Group, PLLC

(57) ABSTRACT

An occupant protection apparatus for a vehicle includes: a main bag that, when an occupant who is seated in a seat of the vehicle is about to fall forward, is deployed in front of the occupant and is capable of supporting the head and upper body of the occupant; a sub-bag that is deployed on a longitudinal centerline side of the head of the occupant who plunges into the main bag; and a center bag that is deployed in the center in a lateral direction of the vehicle. The sub-bag is deployed on a door side of the center bag and, when subjected to a load of the head of the occupant who plunges into at least the main bag while being inclined toward the longitudinal centerline side, comes into contact with the lateral side of the center bag on the door side so as to overlap it.

20 Claims, 8 Drawing Sheets

OCCUPANT PROTECTION APPARATUS FOR VEHICLE

CROSS REFERENCES TO RELATED APPLICATIONS

The present application claims priority from Japanese Patent Application No. 2014-160707 filed on Aug. 6, 2014, the entire contents of which are hereby incorporated by reference.

BACKGROUND

1. Technical Field

The present invention relates to an occupant protection apparatus for a vehicle such as an automobile.

2. Related Art

An occupant protection apparatus for a vehicle is disclosed in, for instance, Japanese Unexamined Patent Application Publication (JP-A) No. 2000-247199. According to the occupant protection apparatus of JP-A No. 2000-247199, a passenger-side airbag mounted on top of a dashboard is deployed in front of a front passenger seat. In the event of a head-on crash where the front ends of two vehicles collide with each other in opposite directions, an occupant seated in the passenger seat falls forward and plunges into the deployed passenger-side airbag. The passenger-side airbag is capable of supporting the head and upper body of the falling-forward occupant.

However, not all vehicles collide head-on with each other. For instance, vehicles may be subjected to a frontal oblique collision with each other.

When a vehicle equipped with the occupant protection apparatus ("subject vehicle") may be collided by another vehicle from an oblique front on the side of the driver's seat, the occupant seated in the passenger seat of the subject vehicle falls forward while falling toward the longitudinal centerline side of the vehicle. In this case, the head and upper body of the falling-forward occupant may drop toward the longitudinal centerline side of the deployed passenger-side airbag.

To prevent the occupant from dropping, it is conceivable that a deployment area of the passenger-side airbag is expanded to the longitudinal centerline side or that a sub-bag is projected from the thus expanded area to the rear of the vehicle.

However, only expanding the deployment area of the passenger-side airbag to the longitudinal centerline side makes it difficult to properly support the occupant who is plunging into the airbag while being inclined toward the longitudinal centerline side.

Specifically, when the occupant seated in the passenger seat plunges into the passenger-side airbag while being inclined toward the longitudinal centerline side, the load of the occupant is exerted on an end of the passenger-side airbag on the longitudinal centerline side. The load of the occupant acts as a force directed obliquely forward on the longitudinal centerline side so as to move away from the passenger-side airbag. For this reason, the passenger-side airbag that is deployed toward the longitudinal centerline side tends to fall toward the longitudinal centerline side due to the load of the occupant. As a result, the head and upper body of the occupant that is initially supported by the passenger-side airbag may drop on the longitudinal centerline side of the passenger-side airbag since the passenger-side airbag becomes inclined toward the longitudinal centerline side.

SUMMARY OF THE INVENTION

Accordingly, it is an object of the present invention to provide an occupant protection apparatus for a vehicle that improves the protection of an occupant who falls forward while being inclined toward the longitudinal centerline side of the vehicle.

An aspect of the present invention provides an occupant protection apparatus for a vehicle including: a main bag that, when an occupant who is seated in a seat of the vehicle is about to fall forward, is deployed in front of the and is capable of supporting the head and upper body of the occupant; a sub-bag that is deployed on the longitudinal centerline side of the head of the occupant who plunges into the main bag; and a center bag that is deployed in the center in a lateral direction of the vehicle. The sub-bag is deployed on the door side of the center bag and, when subjected to a load of the head of the occupant who plunges into at least the main bag while being inclined toward the longitudinal centerline side, comes into contact with the lateral side of the center bag on the door side so as to overlaps the lateral side of the center bag.

The center bag may be a far-side airbag that is deployed in the center in the lateral direction of the vehicle.

A contact surface of at least one of the center bag and the sub-bag which come into contact with each other so as to overlap each other may be formed so as to reduce friction.

The center bag may be deployed from a rear portion to a front portion of the vehicle, and the contact surface of at least one of the center bag and the sub-bag may be formed to reduce friction in the longitudinal direction of the vehicle and suppress slippage in the vertical direction of the vehicle.

DETAILED DESCRIPTION

Examples of the present invention will be described below with reference to the attached drawings.

First Example

Figure 1:
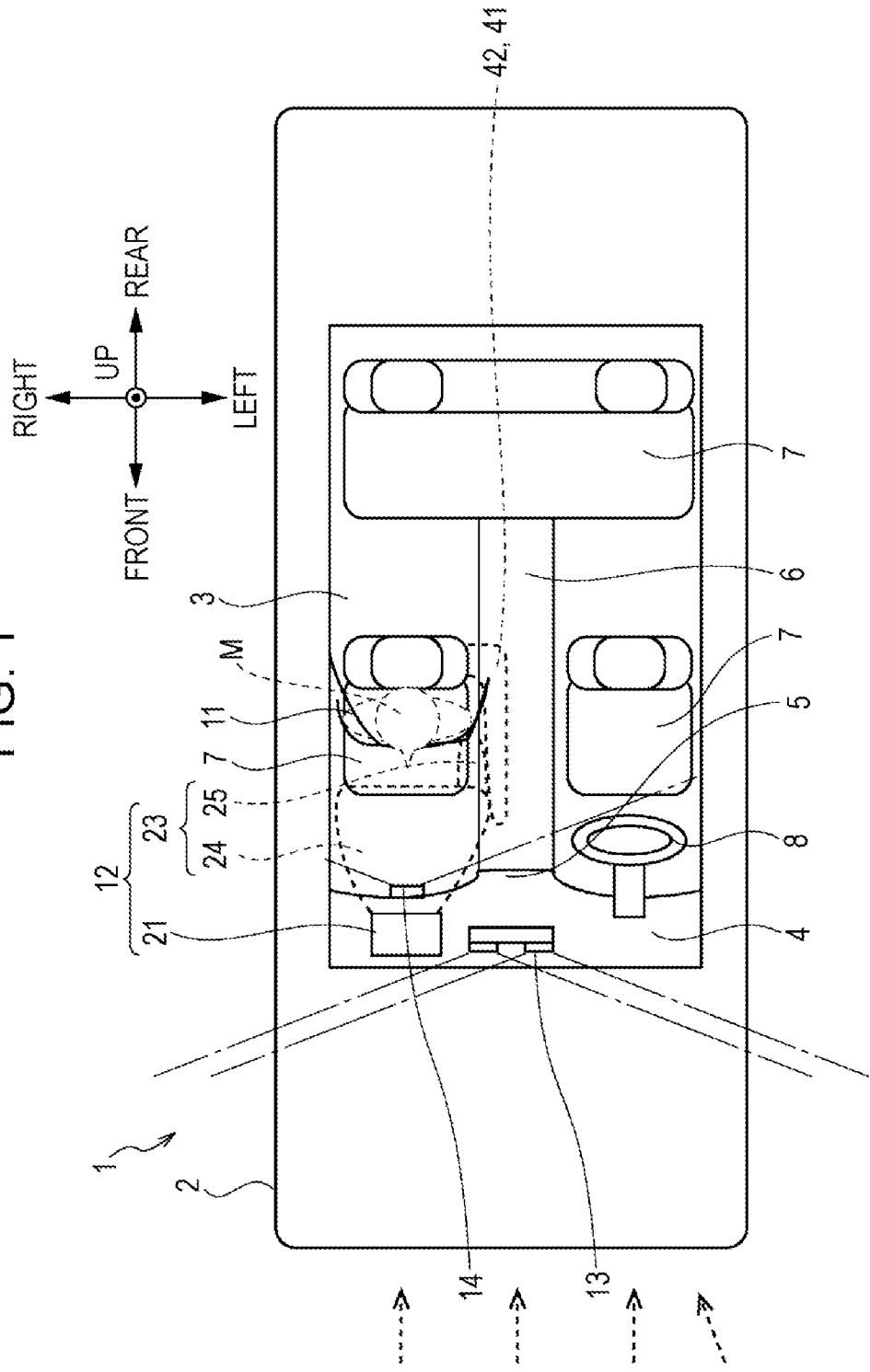
FIG. 1 illustrates a vehicle provided with an occupant protection apparatus for a vehicle according to an example of the present invention.

FIG. 1 illustrates a vehicle 1 provided with an occupant protection apparatus 10 according to a first example of the present invention.

The vehicle 1 may be any vehicle having an engine that burns fuel, a motor that runs on stored electric power, or both.

Referring to FIG. 1, the vehicle 1 has a passenger compartment 3 in the center in the longitudinal direction of a vehicle body 2. A dashboard 4 is disposed in the front of the passenger compartment 3. A center console 5 is disposed in the dashboard 4 in the center in the lateral direction of the vehicle body 2. A center tunnel 6 is formed so as to extend toward the rear of the vehicle body 2 from the center console 5. The dashboard 4 and the center console 5 are provided with, for instance, an instrument panel, a glove box, and an operating panel for various pieces of equipment.

A driver's seat 7 in which a driver is seated is mounted on the left side of the center tunnel 6. A steering wheel 8 is disposed in front of the driver's seat 7. The steering wheel 8 is mounted at a rear end of a boss extending from the dashboard 4.

A passenger's seat 7 in which an occupant M is seated is disposed on the right side of the center tunnel 6. The driver's seat 7 and the passenger's seat 7 may be switched.

A seat 7 for a rear occupant is disposed at the rear of the driver's seat 7 and the passenger's seat 7. The seat 7 for a rear occupant has a laterally elongated shape.

The vehicle 1 thus configured travels on a road or the like and, when travelling, has a possibility of colliding with another vehicle or the like. For this reason, the vehicle 1 uses the occupant protection apparatus 10 to protect its occupants M, including the driver, from an impact of a rear-end collision. For instance, if the vehicle body 2 of the vehicle 1 with an occupant M seated in the passenger's seat 7 collides head-on with another vehicle, the upper body of the occupant M seated in the passenger's seat 7 falls forward. At this time, the upper body and head of the falling-forward occupant M seated in the passenger's seat 7 are likely to be hit against the dashboard 4.

Figure 2:
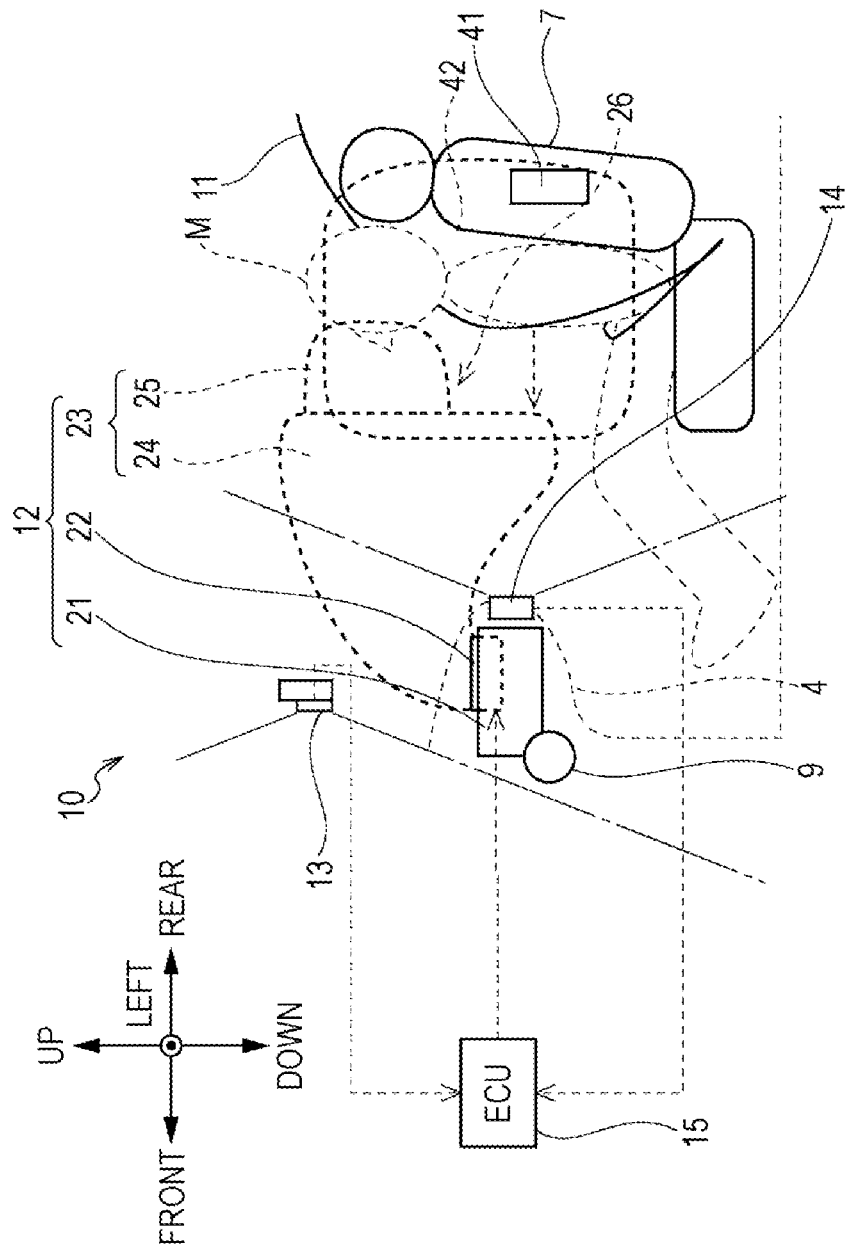
FIG. 2 illustrates the occupant protection apparatus.

FIG. 2 illustrates the occupant protection apparatus 10 of the vehicle 1. FIG. 2 specifically illustrates the occupant protection apparatus 10 for a passenger seat.

The occupant protection apparatus 10 for a passenger seat illustrated in FIG. 2 includes a seat belt module 11, a front airbag module 12, a far-side airbag module 41, an exterior imaging sensor 13, an interior imaging sensor 14, and an engine control unit (ECU) 15.

The seat belt module 11 has a three-point seat belt. As illustrated in FIG. 1, the three-point seat belt supports the waist of the occupant M on both its sides and the shoulder of the occupant M on its outer side. The occupant M seated in the seat 7, when supported by the seat belt module 11, is prevented from being ejected from the seat 7 in the event of a collision.

The front airbag module 12 includes a housing 21, an inflator 22, and an airbag 23.

The housing 21 is disposed inside the dashboard 4 so as to be located in front of the passenger's seat 7. The housing 21 is mounted on a beam 9 extending in the lateral direction. The beam 9 may be a component on which the steering wheel 8 is mounted.

The inflator 22 houses a highly pressurized gas. The highly pressurized gas is expanded through ignition of an explosive material or the like.

The airbag 23 is a bag made by sewing together pieces of fabric. The airbag 23 is mounted on the inflator 22. The airbag 23 and the inflator 22 are housed in the housing 21.

In the front airbag module 12 disposed in front of the seat 7 as described above, the inflator 22 causes a highly pressurized gas to be expanded in response to an ignition signal from the ECU 15. As a result, the airbag 23 is deployed in front of the occupant M seated in the seat 7. The front airbag module 12 is deployed between the occupant M and the dashboard 4. This causes the occupant M falling forward by a crash impact to be supported by the deploying airbag 23.

The far-side airbag module 41 is mounted on the back of the passenger's seat 7. The far-side airbag module 41 deploys a far-side airbag 42 from the side surface of the back of the seat 7 on the longitudinal centerline side. The deploying far-side airbag 42 extends in the forward direction over the center tunnel 6.

The exterior imaging sensor 13 captures an image of objects around the vehicle body 2 of the vehicle 1. As illustrated in FIG. 1, the exterior image sensor 13 is mounted on the front surface of a rearview mirror mounted on the upper part of the passenger compartment 3. From a captured image, the exterior image sensor 13 detects a vehicle or other structure present around the vehicle body 2 of the vehicle 1. The exterior image sensor 13 is capable of detecting another vehicle that is about to collide with the vehicle 1 before the collision occurs. The exterior image sensor 13 outputs to the ECU 15 a relative direction and relative distance of the detected object.

The interior imaging sensor 14 captures an image of the passenger compartment 3 of the vehicle 1. As illustrated in FIG. 1, the interior imaging sensor 14 is mounted on the dashboard 4 so as to be located in front of the passenger's seat 7. From a captured image, the interior imaging sensor 14 detects the occupant M seated in the seat 7. The interior imaging sensor 14 is capable of detecting the posture of the occupant M seated in the seat 7 immediately before a collision occurs. The interior imaging sensor 14 outputs to the ECU 15 the detected position of the upper body and head of the occupant M.

The ECU 15 is a computing device mounted on the vehicle 1. The ECU 15 is, for instance, a microcontroller. The ECU 15 is connected to the front airbag module 12, the far-side airbag module 41, the exterior imaging sensor 13, and the interior imaging sensor 14. The ECU 15 may also be connected to an acceleration sensor and the seat belt module 11 and the like. The ECU 15 detects a collision through the reception of a detection signal from the acceleration sensor or the exterior imaging sensor 13 and outputs a tension signal to the seat belt module 11 and an ignition signal to the inflator 22. Furthermore, the ECU 15 may predict a collision based on a detection signal from the exterior imaging sensor 13 and may output a tension signal to the seat belt module 11 and an ignition signal to the inflator 22. This causes the front airbag module 12 and the far-side airbag 42 to be deployed.

The occupant protection apparatus 10 described above is capable of, in the event of a collision, protecting the occupant M from being ejected or protecting the upper body and head of the occupant M seated in the seat 7 from being hit directly against the dashboard 4 or the like. For instance, if the vehicle 1 collides head-on to another vehicle, the occupant M seated in the passenger seat falls forward and plunges into the deploying passenger-side airbag 23. The passenger-side airbag 23 is capable of supporting the head and upper body of the falling-forward occupant M.

However, the front end of the vehicle 1 and the front end of the other vehicle do not always collide with each other in opposite directions. For instance, the vehicle 1 may be collided by the other vehicle from an oblique front, the other vehicle being offset to the door side.

FIG. 3 illustrates a conventional passenger-side occupant protection apparatus 10 in a deployed state according to the first example of the present invention. Referring to FIG. 3, a dummy for use in, for instance, testing of safety standards for crashworthiness is seated in the seat 7 as the occupant M. In the description that follows, the dummy is referred to as the occupant M.

Unlike the airbag 23 according to this example illustrated in FIGS. 1 and 2, an airbag illustrated in FIGS. 3A to 3D is deployed only in front of the occupant M. The airbag 23 of this type is deployed only in the frontal direction of the occupant M.

Figure 3A:
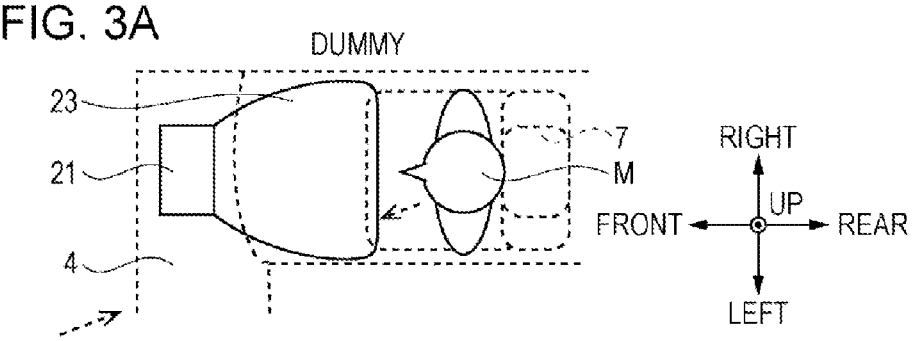
FIGS. 3A to 3D illustrate a conventional passenger-side occupant protection apparatus in a deployed state in a first comparison.

As illustrated in FIG. 3A, in the case where the vehicle 1 is collided by the other vehicle, which is offset to the door side, from an oblique front, the upper body and head of the occupant M fall forward while falling toward the longitudinal centerline side of the vehicle body 2, instead of falling directly forward. The upper body and head of the occupant M fall obliquely forward so as to fall toward the longitudinal centerline side.

Figure 3B:
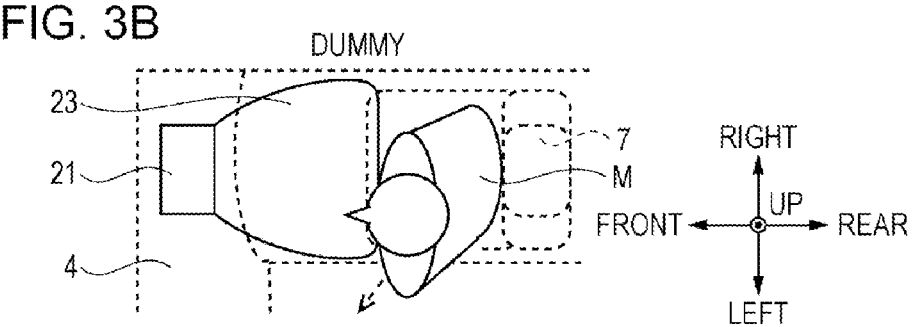
Figure 3C:
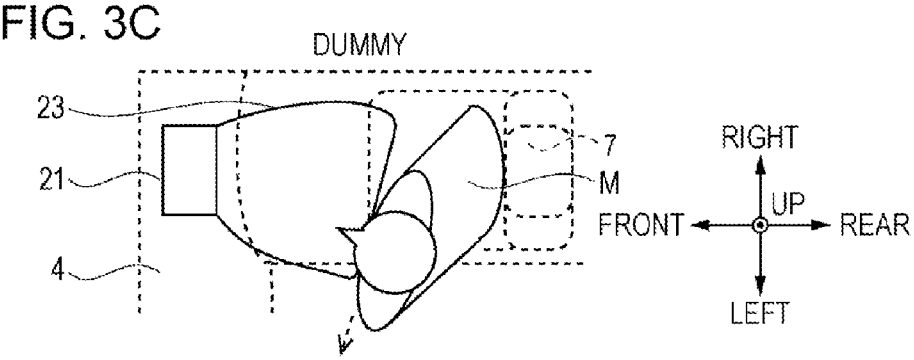

As illustrated in FIG. 3B, the falling upper body and head obliquely are hit against the longitudinal centerline side of the deployed airbag 23. As illustrated in FIG. 3C, the occupant M obliquely hit against the airbag causes the deployed airbag 23 to fall toward the longitudinal centerline side together with the occupant M. As a result, in extreme cases, the falling upper body and head of the occupant M may be deflected away from the deployed airbag 23 so as to drop toward the longitudinal centerline side of the airbag 23, as illustrated in FIG. 3D.

Figure 3D:
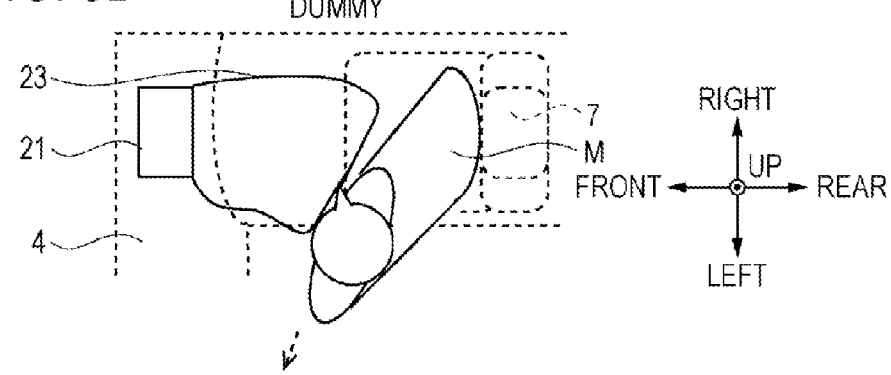

As can be seen from a comparison between FIG. 3D and FIG. 3C, the head of the occupant M is rotated to a larger degree as compared to the upper body. A greater degree of head rotation compared to the upper body is likely to result in a greater level of load being exerted on the neck of the occupant M.

As described above, a conventional airbag 23 for use in the occupant protection apparatus 10 poses a potential risk of compromising the protection of the occupant M in the event of an oblique offset collision. This is likely to result in the occupant protection apparatus 10 being less effective for occupant protection in the event of an oblique offset collision.

In consideration of the above situation, the occupant protection apparatus 10 is required to provide improved protection of the occupant M who is moving toward the longitudinal centerline side of the vehicle 1 while falling forward. The occupant protection apparatus 10 is required to improve occupant protection in the event of an oblique offset collision.

In this example, by devising a better shape of the airbag 23, the occupant protection apparatus 10 supports from the longitudinal centerline side the occupant M who is falling toward the longitudinal centerline side in the event of a collision and thereby improves the protection of the occupant M who is moving toward the longitudinal centerline side of the vehicle 1 while falling forward. This example will be described below in detail.

Figure 4A:
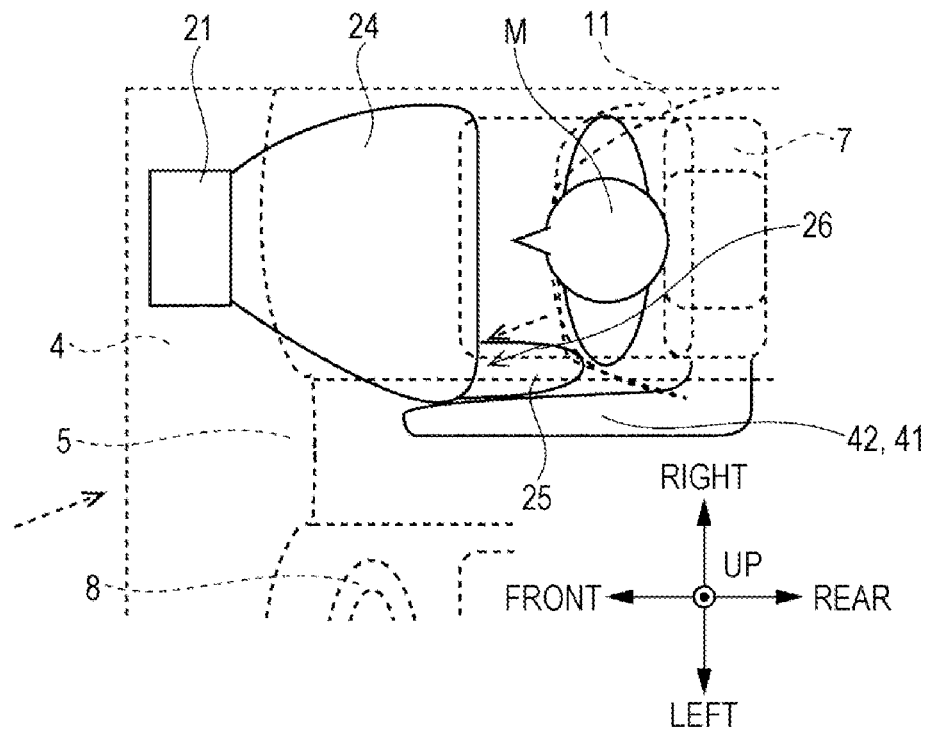
FIGS. 4A and 4B illustrate the passenger-side occupant protection apparatus.
Figure 4B:
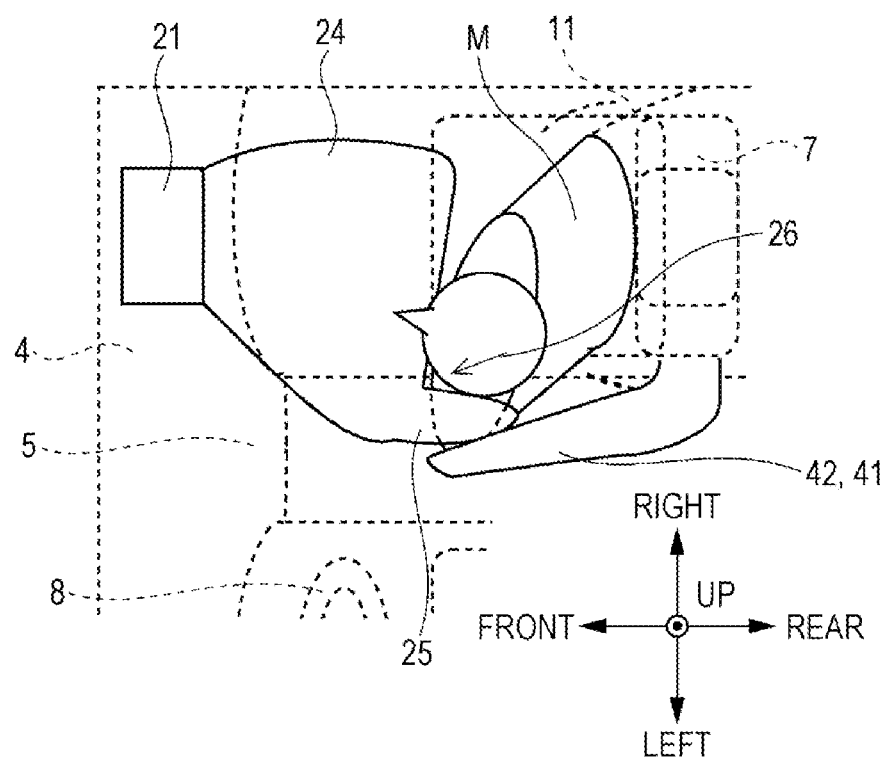

FIGS. 4A and 4B illustrate in detail the passenger-side occupant protection apparatus 10. FIG. 4A illustrates a state before the occupant M falls forward. FIG. 4B illustrates a state where the occupant M falls toward the longitudinal centerline side of the vehicle 1 while falling forward.

The occupant protection apparatus 10 illustrated FIG. 4A has an airbag 23 formed of a main bag 24 and a sub-bag 25.

The main bag 24 is a bag made by sewing together pieces of fabric. The main bag 24 is mounted on the inflator 22. As illustrated in FIG. 4A, the main bag 24 is deployed in front of the occupant M seated in the seat 7. In other words, the main bag 24 is deployed between the occupant M and the dashboard 4. With this arrangement, the main airbag 24 is capable of supporting the head and upper body of the occupant M who is falling forward in the event of a head-on collision.

The sub-bag 25 is a bag made by sewing together pieces of fabric. The sub-bag 25 is installed on the longitudinal centerline side of a surface in the main airbag 24 into which the occupant M plunges. The sub-bag 25 is formed so as to be longitudinally longer than the head of the occupant M plunging into the main bag 24.

The sub-bag 25 is communicated with the main bag 24, forming a space therebetween. Upon being pressurized by receiving a highly pressurized gas from the ignited inflator 22, the sub-bag 25 is deployed together with the main bag 24. Specifically, the sub-bag 25 is deployed on the longitudinal centerline side of the head of the occupant M who plunges toward the main bag 24. The sub-bag 25 is deployed so as to extend rearward from the longitudinal centerline side of a portion of the main bag 24 into which the occupant M plunges, namely, is deployed on the longitudinal centerline side of the head of the occupant M plunging into the main bag 24.

When the main bag 24 and the sub-bag 25 are deployed in the state illustrated in FIG. 4A, a corner portion 26 formed by the main bag 24 and the sub-bag 25 is located on the longitudinal centerline side obliquely to the front of the occupant M seated in the seat 7. Also, the main bag 24 and the sub-bag 25 overlap the far-side airbag 42 on their longitudinal centerline sides. The main bag 24 and the sub-bag 25 may be in contact with the far-side airbag 42.

With this arrangement, when the occupant M obliquely plunges into the main bag 24 while falling toward the longitudinal centerline side in the event of an oblique offset collision, the head of the occupant M plunges into the corner portion 26 of the main bag 24, namely, into a portion of the main bag 24 adjacent to the sub-bag 25, as illustrated in, for instance, FIG. 4B.

When the corner portion 26 of the main bag 24 is compressed by the occupant M, the adjacent projecting sub-bag 25 is rotated toward the door side. The sub-bag 25 is deformed toward the door side in relation to the main bag 24. As a result, the sub-bag 25 that is in contact with the back of the head of the occupant M plunging into the main bag 24 exerts a force toward the door side on the back of the head of the occupant M.

The main bag 24 and the sub-bag 25 into which the upper body and head of the occupant M obliquely plunge fall toward the longitudinal centerline side of the vehicle body 2. However, the far-side airbag 42 is deployed on the longitudinal centerline side of the main bag 24 and the sub-bag 25. The main bag 24 and the sub-bag 25 are supported by the far-side airbag 42 and are prevented from falling toward the longitudinal centerline side.

Accordingly, the head, which plunges into the main bag 24, is pressed and supported from the longitudinal centerline side by the sub-bag 25 that is suppressed from falling toward the longitudinal centerline side. The upper body and head of the occupant M who becomes inclined toward the longitudinal centerline side and is moving obliquely forward are suppressed from falling toward the longitudinal centerline side of the main bag 24 and the sub-bag 25. In addition, the head, which is supported by the sub-bag 25 and the rear portion of which is also pressed by the sub-bag 25, remains in its state after plunging into the main bag 24 and is suppressed from sliding and turning on the fallen main bag 24 toward the longitudinal centerline side. The head of the occupant M is suppressed from being subjected to a larger degree of rotation as compared to the upper body.

As can be seen from a comparison between FIG. 4B and FIG. 3D, the sub-bag 25 that is suppressed from falling presses the back of the head toward the door side, causing the head of the occupant M to being suppressed from being subjected to a large degree of rotation as compared to the upper body.

As a result, the occupant M who becomes inclined toward the longitudinal centerline side and is moving forward, after supported initially by the main bag 24 and the sub-bag 25, is suppressed from falling toward the longitudinal centerline side of the main bag 24 and the sub-bag 25, resulting in enhanced occupant protection being provided during an oblique offset collision.

The same level of protection is provided when the sub-bag 25 comes into contact with a region from at least the side to the back of the head of the occupant M who obliquely plunges into the main bag 24 while falling toward the longitudinal centerline side.

Figure 5A:
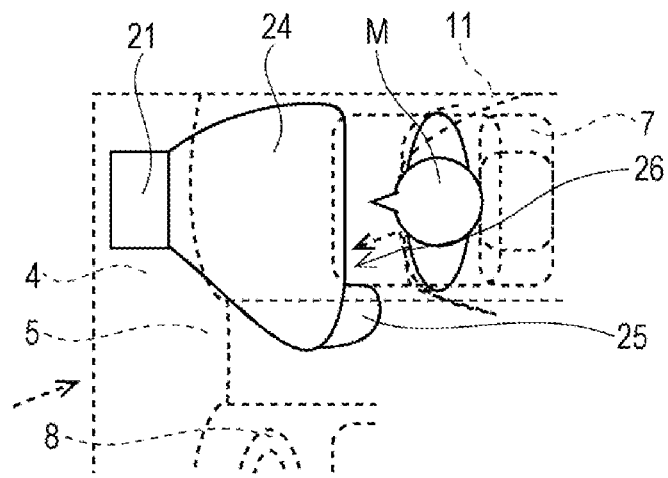
FIGS. 5A to 5C illustrate a passenger-side occupant protection apparatus in a deployed state in a second comparison.
Figure 5B:
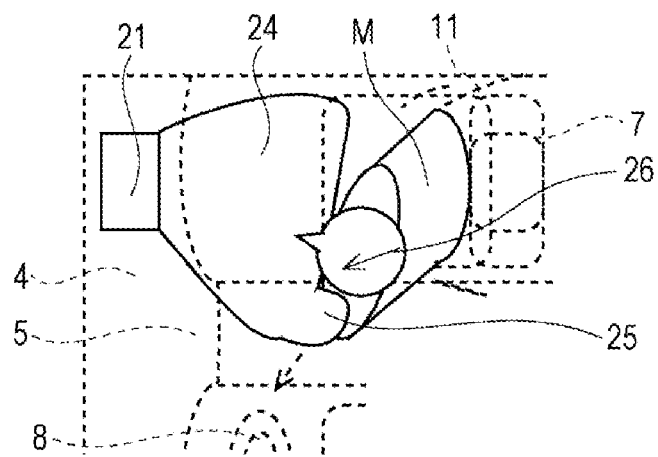
Figure 5C:
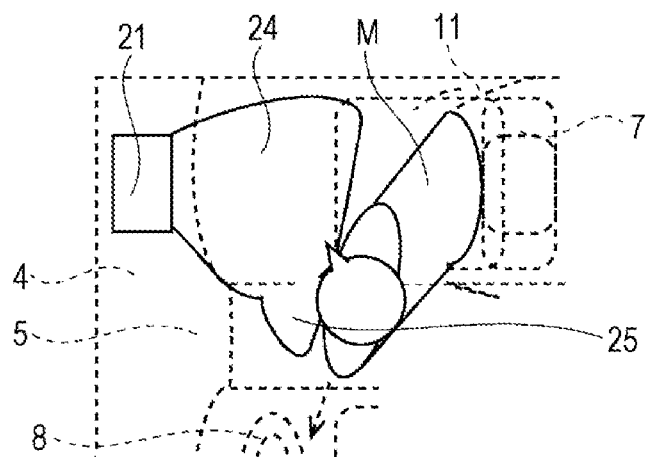

FIGS. 5A to 5C illustrate a passenger-side occupant protection apparatus 10 in a deployed state in a second comparison. FIGS. 5A to 5C illustrate the sub-bag 25 projecting rearward from the longitudinal centerline side of the main bag 24.

In FIGS. 5A to 5C, the sub-bag 25 projects rearward from the longitudinal centerline side of the main bag 24, as is the case with FIGS. 4A and 4B. However, the sub-bag 25 projects only rearward in a straight line. The sub-bag 25 does not cover the back of the head of the occupant M. Also, the sub-bag 25 has no support provided by the far-side airbag 42.

As illustrated in FIG. 5A, when the occupant M is inclined toward the longitudinal centerline side and is moving obliquely forward, the head of the occupant M plunges into the corner portion 26 formed by the main bag 24 and the sub-bag 25. As a result, the main bag 24 and the sub-bag 25, together with the occupant M, are inclined toward the longitudinal centerline side, as illustrated in FIG. 5B.

Then, when the occupant M becomes further inclined toward the longitudinal centerline side and is about to fall, the head of the occupant M plunging into the corner portion 26 slides toward the longitudinal centerline side, as illustrated in FIG. 5C. After pressed by the head sliding toward the longitudinal centerline side, the sub-bag 25 falls down. The sub-bag 25 falls toward the longitudinal centerline side of a surface of the main bag 24 into which the occupant plunges. As a result, the head and the upper body of the occupant M plunging into the main bag 24 and the sub-bag 25 may fall toward the longitudinal centerline side of the main bag 24 and the sub-bag 25 across the sub-bag 25.

As described above, only expanding the deployment area of the airbag 23 to the longitudinal centerline side or only projecting the sub-bag 25 rearward from the expanded portion makes it impossible to properly support the occupant M who is plunging while being inclined toward the longitudinal centerline side. As a result, it is impossible to provide a high level of safety to the occupant M who plunges while being inclined toward the longitudinal centerline side.

In other words, when the occupant M seated in the passenger seat plunges into the passenger-side airbag 23 while being inclined toward the longitudinal centerline side, the load of the occupant M is exerted on an end of the airbag 23 on the longitudinal centerline side. Also, the load of the occupant M acts as a force in an oblique frontal direction on the longitudinal centerline side so as to move away from the airbag 23. For this reason, the passenger-side airbag 23 that is deployed toward the longitudinal centerline side tends to fall toward the longitudinal centerline side due to the load of the occupant M. The head and upper body of the occupant M who is initially supported by the passenger-side airbag 23 are likely to fall toward the longitudinal centerline side since the passenger-side airbag 23 becomes inclined toward the longitudinal centerline side.

In the second comparison illustrated in FIGS. 5A to 5C, as is the case with the first comparison of FIG. 3D, the head of the occupant M slides from the location at which the head plunges and is rotated to a larger degree as compared to the upper body. A greater degree of head rotation as compared to the upper body is likely to result in a greater level of load being exerted on the neck of the occupant M.

Also, in the second comparison illustrated in FIGS. 5A to 5C, as is the case with the first comparison of FIG. 3D, the passenger-side airbag 23 falls toward the longitudinal centerline side under the load of the occupant M.

In the above description, the occupant M who is plunging while being inclined toward the longitudinal centerline side plunges to the corner portion 26 formed by the main bag 24 and the sub-bag 25. However, the location at which the occupant M obliquely plunges into the airbag 23 is not limited to the corner portion 26. As illustrated in FIGS. 5A to 5C, since the sub-bag 25 only projecting does not provide a function of supporting the head from the longitudinal centerline side, a deviation of the plunging area away from the corner portion 26 makes it more difficult for the sub-bag 25 to function as a support for the head. If the sub-bag 25 is not deployed close to the head, the function of causing the sub-bag 25 to support the head is not provided.

As described above, this example causes the sub-bag 25 to be deployed so as to project toward the longitudinal centerline side of the head of the occupant M who plunges into the main bag 24. With this arrangement, the head of the occupant M who plunges into the main bag 24 while being inclined toward the longitudinal centerline side can be supported by the sub bag 25 and the main bag 24.

In addition, the sub-bag 25 is deployed in the door side of the far-side airbag 42 and, when the load of the head of the occupant M who plunges into, at least, the main bag 24 while being inclined toward the longitudinal centerline side is exerted, overlaps and comes into contact with the lateral side of the center airbag on the door side. The sub-bag 25 is supported by the far-side airbag 42. With this arrangement, even if a load of the occupant M in the obliquely frontal direction causes the main bag 24 and the sub-bag 25, together with the occupant M, to become inclined toward the longitudinal centerline side, such inclination can be suppressed by the far-side airbag 42. The main bag 24 and the sub-bag 25 are suppressed from being inclined toward the longitudinal centerline side. As a result, the occupant M who plunges into the main bag 24 while being inclined toward the longitudinal centerline side is suppressed from falling in the longitudinal centerline side of the main bag 24 and the sub-bag 25.

Furthermore, since the main bag 24 and the sub-bag 25 are suppressed from being inclined toward the longitudinal centerline side, the head of the occupant M who plunges into the main bag 24 is suppressed from being rotated after plunging. This reduces the chance of damage to the neck of the occupant M that is caused when the head of the occupant M is rotated toward the door side more than the upper body.

In contrast, in a case where the sub-bag 25 is just projected from the main bag 24, as illustrated in FIGS. 5A to 5C, the occupant M who plunges into the main bag 24 tends to fall down from the main bag 24 and the sub-bag 25 when the main bag 24 and the sub-bag 25 become inclined toward the longitudinal centerline side together with the occupant M, although this case is considered an improvement over that of FIGS. 3A to 3D. The falling-down occupant M is supported only at the head by the sub-bag 25, causing the upper body to fall down before the head. As a result, the head of the occupant M who plunges into the main bag 24 tends to be turned after plunging. A greater degree of rotation of the head of the occupant M as compared to the upper body is likely to result in damage to the neck of the occupant M.

As described above, the occupant protection apparatus according to this example is suppressed from being inclined toward the longitudinal centerline side because the main bag 24 and the sub-bag 25 are supported by far-side airbag 42. Accordingly, the head and the upper body of the occupant M who plunges into the main bag 24 while being inclined toward the longitudinal centerline side can be supported on a continuous basis. In addition, the head of the supported occupant M can be suppressed from being rotated to a larger degree as compared to the upper body. Consequently, the chance of damage to the occupant M who falls forward while being inclined toward the longitudinal centerline side can be reduced, thereby allowing improved protection to be provided to the occupant M.

In this example, the main bag 24 and the sub-bag 25 come into contact with the far-side airbag 42 that is deployed along the longitudinal center line of the vehicle. Accordingly, other airbag 23 already mounted on the vehicle 1 can be used to support the main bag 24 and the sub-bag 25.

The main bag 24 and the sub-bag 25 may be brought into contact with an airbag contained in the driver-side front airbag module, in addition to the far-side airbag 42. This also can support the main bag 24 and the sub-bag 25 and suppress them from falling down.

Second Example

Next, an occupant protection apparatus 10 of a vehicle 1 according to a second example of the present invention is described below. Differences from the first example are mainly described below. The reference numerals and symbols in the second example refer to the same components as those with the same reference numerals and symbols in the first example, and repeated descriptions of the same components are omitted.

Figure 6:
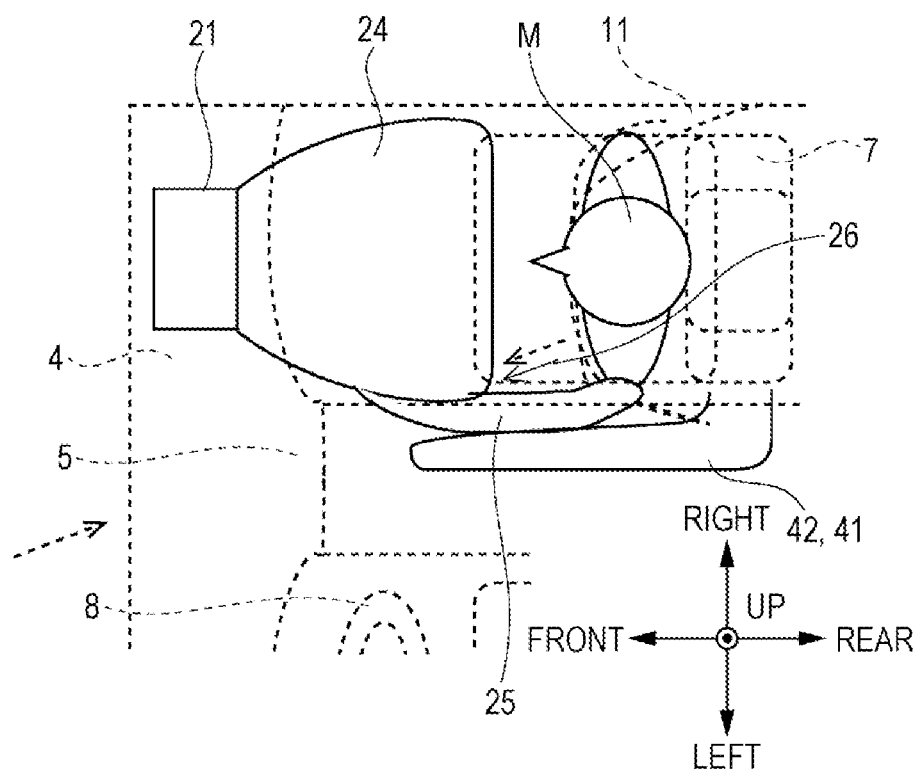
FIG. 6 illustrates in detail a passenger-side occupant protection apparatus according to a second example of the present invention.

FIG. 6 illustrates a passenger-side occupant protection apparatus 10 according to a second example.

As illustrated in FIG. 6, a front airbag module 12 has a housing 21, an inflator 22, and an airbag 23. The airbag 23 has a main bag 24 and a sub-bag 25.

The sub-bag 25 projects from the longitudinal centerline side of the main bag 24. The sub-bag 25 extends rearward along the longitudinal centerline side of the main bag 24. The sub-bag 25 extends rearward beyond a surface of the main bag 24 into which the occupant M plunges.

A far-side airbag 42 is deployed in the longitudinal centerline side of the sub-bag 25. The far-side airbag 42 and the sub-bag 25 overlap each other.

When the main bag 24 and the sub-bag 25 are deployed in a state illustrated in FIG. 6, a corner portion 26 formed by the main bag 24 and the sub-bag 25 is located on the longitudinal centerline side obliquely to the front of the occupant M seated in the seat 7.

With this arrangement, when the occupant M obliquely plunges into the main airbag 24 while falling toward the longitudinal centerline side in the event of an oblique offset collision, the head of the occupant M plunges into the corner portion 26. Since the load of the occupant M acts on the corner portion 26 of the main bag 24, the sub-bag 25 presses the longitudinal centerline side of the back of the head. As a result, when the head plunges into the main bag 24, a force can be exerted on the back of the head.

Accordingly, the head that plunges into the main bag 24 is supported from the longitudinal centerline side by the sub-bag 25. The sub-bag 25 is supported by the far-side airbag 42 and suppressed from falling toward the longitudinal centerline side. The upper body and head of the occupant M who becomes inclined toward the longitudinal centerline side and is moving obliquely forward are suppressed from falling toward the longitudinal centerline side of the main bag 24 and the sub-bag 25. In addition, the head whose back is pressed by the sub-bag 25 remains in its state after plunging into the main bag 24 and is suppressed from sliding and turning on the main bag 24 toward the longitudinal centerline side. The head of the occupant M is suppressed from being subjected to a larger degree of rotation as compared to the upper body.

Also, the head of the occupant M is pressed by the sub-bag 25 toward the door side and is suppressed from being subjected to a larger degree of rotation as compared to the upper body.

As a result, the occupant M who becomes inclined toward the longitudinal centerline side and is moving obliquely forward is initially supported by the main bag 24 and the sub-bag 25 and is suppressed from falling toward the longitudinal centerline side of the main bag 24 and the sub-bag 25, thereby providing occupants with enhanced protection in the event of an obliquely offset collision.

The same level of protection is provided when the sub-bag 25 comes into contact with a region from at least the side to the back of the head of the occupant M who obliquely plunges into the main bag 24 while falling toward the longitudinal centerline side.

As described above, the sub-bag 25 projecting from the longitudinal centerline side of the main bag 24 also can suppress the sub-bag 25 from falling through the use of the far-side airbag 42, as is the case with the sub-bag 25 projecting from a surface of the main bag 24 into which the occupant M plunges.

Third Example

Next, an occupant protection apparatus 10 of a vehicle 1 according to a third example of the present invention is described below. Differences from the first example are mainly described below. The reference numerals and symbols in the third example refer to the same components as those with the same reference numerals and symbols in the first example, and repeated descriptions of the same components are omitted.

Figure 7A:
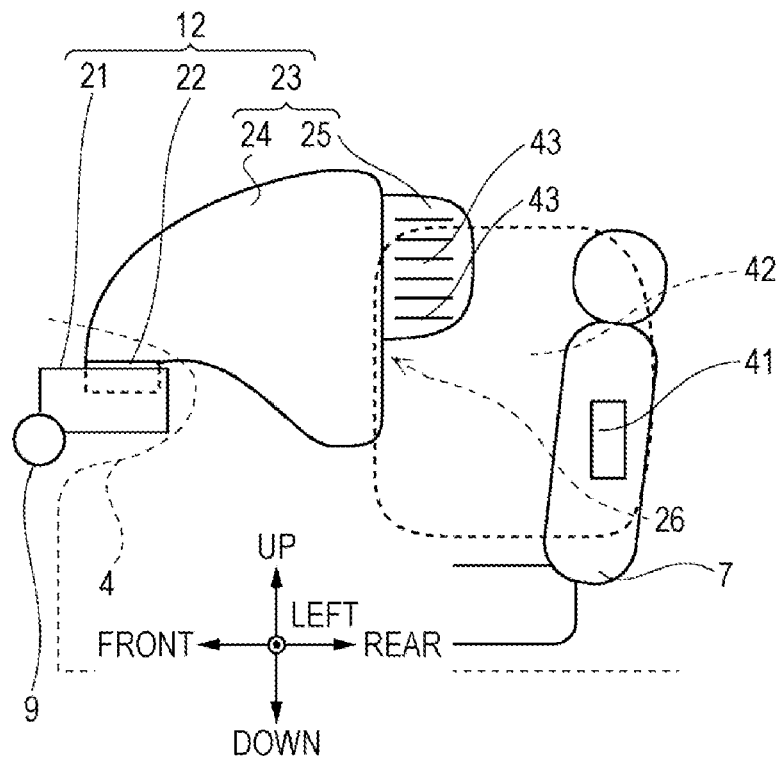
FIGS. 7A and 7B illustrate in detail a passenger-side occupant protection apparatus according to a third example of the present invention.
Figure 7B:
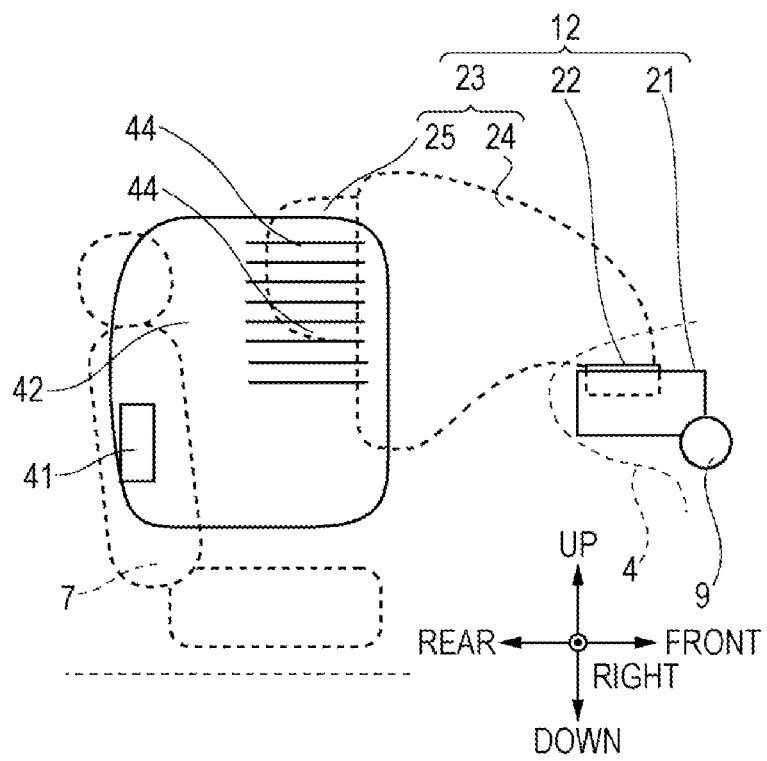

FIGS. 7A and 7B illustrate in detail a passenger-side occupant protection apparatus 10 according to the third example. FIG. 7A is a diagram illustrating the longitudinal centerline side of the sub-bag 25. FIG. 7B is a diagram illustrating the lateral side of the far-side airbag 42 on the door side.

Figure 8:
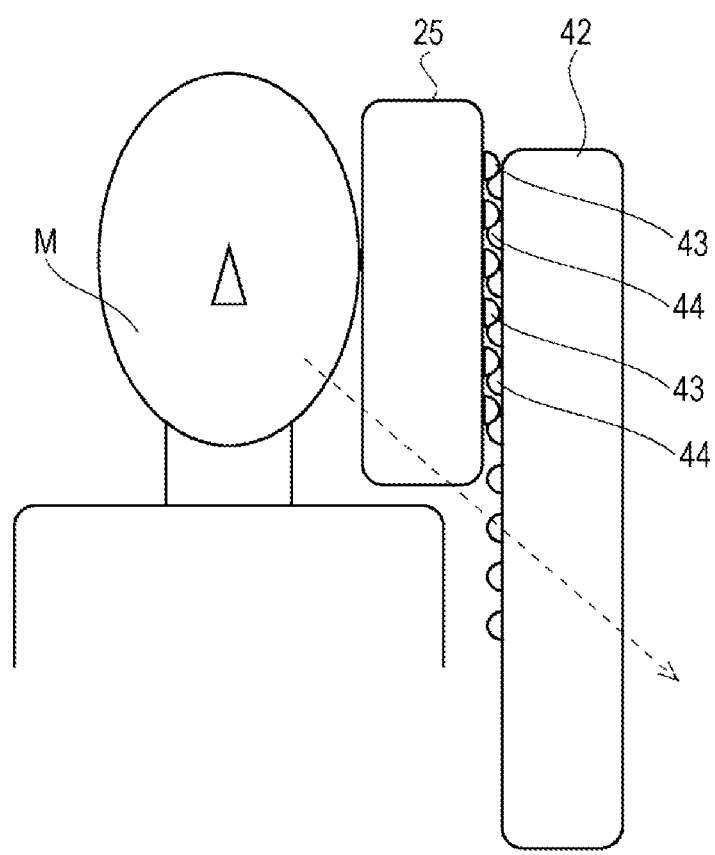
FIG. 8 is a cross-sectional diagram illustrating a state where a sub-bag and a far-side airbag illustrated in FIGS. 7A and 7B overlap each other.

FIG. 8 is a cross-sectional diagram illustrating a state where the sub-bag 25 of FIGS. 7A and 7B and the far-side airbag 42 overlap each other.

As illustrated in FIG. 7A, a plurality of first ridges 43 extending in a longitudinal direction are vertically arranged on the longitudinal centerline side of the sub-bag 25. The first ridges 43 are formed substantially over the entire surface from a front end to a rear end of the sub-bag 25. Also, the first ridges 43 are vertically spaced away from one another.

As illustrated in FIG. 7B, a plurality of second ridges 44 extending in a longitudinal direction are vertically arranged on the lateral side of the far-side airbag 42 on the door side. The second ridges 44 are formed substantially over the entire surface from a front end to a rear end of the far-side airbag 42. Also, the second ridges 44 are vertically spaced away from one another.

As illustrated in FIG. 8, the plurality of first ridges 43 and second ridges 44 vertically overlap one another between the sub-bag 25 and the far-side airbag 42 when both the sub-bag 25 and the far-side airbag 42 are deployed. With this arrangement, a load acting toward the longitudinal centerline side is exerted on the sub-bag 25 which in turn presses against the far-side airbag 42, in which the plurality of first ridges 43 and the second ridges 44 are engaged with one another and are suppressed from sliding in the vertical direction. The sub-bag 25 can be supported by the far-side airbag 42 so as not to sag downwards.

The plurality of first ridges 43 and the second ridges 44 extend longitudinally. Accordingly, the sub-bag 25 and the far-side airbag 42 do not interfere with each other in their deployment in the longitudinal direction when the sub-bag 25 is deployed rearward and the far-side airbag 42 is deployed forward. The first ridges 43 and the second ridges 44 can be configured to be engaged with one another during the deployment so as not to interfere with the deployment in longitudinal direction. In addition, the sub-bag 25 has the first ridges 43 formed thereon, preventing contacts with the far-side airbag 42 over the entire surface. The far-side airbag 42 has the second ridges 44 formed thereon, preventing contacts with the sub-bag 25 over the entire surface. These contact surfaces are configured to reduce friction associated with the deployment.

As described above, the contact surfaces of the far-side bag 42 and the sub-bag 25 are formed to have lower friction coefficient in this example. With this arrangement, the sub-airbag 25 deploying from the front to rear of the vehicle and the far-side airbag 42 deploying from the rear to front of the vehicle can be configured to avoid interference with each other in deployment, even if coming into contact with each other. The far-side airbag 42 and the sub-bag 25 can be deployed in a desired state so as to overlap with each other. The far-side airbag 42 can be deployed in the longitudinal centerline side of the sub-bag 25 while being in the proximity of or in contact with the sub-bag 25.

In addition, in this example, the sub-bag 25 and the far-side airbag 42, when deployed and overlapped with each other with a load acting on the sub-bag 25, are suppressed from sliding in the vertical direction, namely, suppressed from being disengaged from each other. As a result, the sub-bag 25 and the main bag 24 can be forcefully supported by the far-side airbag 42, thereby effectively preventing the sub-bag 25 and the main bag 24 from falling down.

The above preferred example is an instance of the preferred examples of this present invention, but the present invention is not limited to this. Various modifications are conceivable within the scope of the present invention.

In the above example, a surface of the main bag 24 into which the occupant M plunges is formed to have a substantially planar surface along the vertical direction of the vehicle 1, but not limited to this.

The surface of the main bag 24 into which the occupant M plunges may be a surface extending along the longitudinal direction of the vehicle 1 or a curved surface. Even in this case, protection of the occupant M can be improved by applying the present invention.

In this example, the airbag 23 is deployed toward the door side of the far-side airbag 42 and brought into contact with the far-side airbag 42 deployed from the seat 7 before being supported, but not limited to this.

The airbag 23 may be brought into contact with a center curtain airbag deployed from a ceiling of the passenger compartment 3 before being supported.

In the above examples, the present invention is applied to the passenger-side occupant protection apparatus 10 of the vehicle 1, but is not limited to this. The present invention may be applied to the driver-side occupant protection apparatus 10 and the rear-seat occupant protection apparatus 10 of the vehicle 1.

The invention claimed is:

1. A occupant protection apparatus for a vehicle comprising:
    a main bag that, when an occupant who is seated in a seat of the vehicle and is about to fall forward, is deployed in front of the occupant and is capable of supporting a head and upper body of the occupant;
    a sub-bag that is deployed and is capable to be next to a longitudinal centerline side of the head of the occupant who plunges into the main bag; and
    a center bag that is deployed in a fore-aft direction of the vehicle from a center of the vehicle in a width direction of the vehicle,
    wherein the sub-bag is deployed on a door side of the center bag and, when subjected to a load of the head of the occupant who plunges into at least the main bag while being inclined toward the longitudinal centerline side, comes into contact with a lateral side of the center bag on the door side so as to overlap the lateral side of the center bag.

2. The occupant protection apparatus for a vehicle according to claim 1, wherein the center bag comprises a far-side airbag that is deployed in the center in the width direction of the vehicle.

3. The occupant protection apparatus for a vehicle according to claim 1, wherein a contact surface of at least one of the center bag and the sub-bag which come into contact with each other so as to overlap each other is formed so as to reduce friction.

4. The occupant protection apparatus for a vehicle according to claim 2, wherein a contact surface of at least one of the center bag and the sub-bag which come into contact with each other so as to overlap each other is formed so as to reduce friction.

5. The occupant protection apparatus for a vehicle according to claim 1, wherein
    the center bag is deployed from a rear portion to a front portion of the vehicle, and
    the contact surface of at least one of the center bag and the sub-bag is formed so as to reduce friction in the longitudinal direction of the vehicle and suppress slippage in the vertical direction of the vehicle.

6. The occupant protection apparatus for a vehicle according to claim 2, wherein
the center bag is deployed from a rear portion to a front portion of the vehicle, and
the contact surface of at least one of the center bag and the sub-bag is formed so as to reduce friction in the longitudinal direction of the vehicle and suppress slippage in the vertical direction of the vehicle.

7. The occupant protection apparatus for a vehicle according to claim 1, wherein the center bag is deployed to a center side of the seat of the vehicle.

8. The occupant protection apparatus for a vehicle according to claim 1, wherein the center bag is deployed from a side of the seat opposite a door of the vehicle.

9. The occupant protection apparatus for a vehicle according to claim 1, wherein the center bag is deployed between the occupant and a second occupant.

10. The occupant protection apparatus for a vehicle according to claim 1, wherein the center of the vehicle and the door side of the vehicle are on opposite sides of the seat.

11. The occupant protection apparatus for a vehicle according to claim 1, wherein the center bag is deployed from the seat.

12. The occupant protection apparatus for a vehicle according to claim 1, wherein the center bag is deployed so as to prevent a position of the occupant from traversing over a center console of the vehicle disposed in the center of the vehicle in the width direction of the vehicle.

13. The occupant protection apparatus for a vehicle according to claim 1, wherein in a deployed state, the sub-bag and the center bag are disposed sequentially from the door side to the center of the vehicle in the width direction of the vehicle.

14. The occupant protection apparatus for a vehicle according to claim 2, wherein in a deployed state, the sub-bag and the center bag are disposed sequentially from the door side to the center of the vehicle in the width direction of the vehicle.

15. The occupant protection apparatus for a vehicle according to claim 1, wherein in a deployed state, the center bag protrudes past the main bag in the longitudinal direction of the vehicle.

16. The occupant protection apparatus for a vehicle according to claim 1, wherein the main bag and the sub-bag are deployed towards a rear of the vehicle, and
wherein the center bag is deployed towards a front of the vehicle.

17. The occupant protection apparatus for a vehicle according to claim 1, further comprising a center tunnel disposed between the occupant of the vehicle and a second occupant of the vehicle,
wherein the center bag is deployed over the center tunnel.

18. The occupant protection apparatus for a vehicle according to claim 6, wherein the sub-bag is deployed to a center side of the seat of the vehicle.

19. The occupant protection apparatus for a vehicle according to claim 7, wherein the sub-bag is deployed to the center side of the seat of the vehicle.

20. The occupant protection apparatus for a vehicle according to claim 9, wherein the sub-bag is deployed between the occupant and the second occupant.

* * * * *